US008619289B2

(12) United States Patent
Ushikubo

(10) Patent No.: US 8,619,289 B2
(45) Date of Patent: Dec. 31, 2013

(54) IMAGE FORMING APPARATUS AND IMAGE FORMING SYSTEM

(75) Inventor: Yuichi Ushikubo, Fukushima (JP)

(73) Assignee: Oki Data Corporation, Tokyo (JP)

( * ) Notice: Subject to any disclaimer, the term of this patent is extended or adjusted under 35 U.S.C. 154(b) by 722 days.

(21) Appl. No.: 12/634,104

(22) Filed: Dec. 9, 2009

(65) Prior Publication Data

US 2010/0157361 A1 Jun. 24, 2010

(30) Foreign Application Priority Data

Dec. 22, 2008 (JP) ................................ 2008-326038

(51) Int. Cl.
*G06F 3/12* (2006.01)
*G06K 15/00* (2006.01)
*H04N 1/40* (2006.01)
*H04N 1/60* (2006.01)
*G06K 9/00* (2006.01)

(52) U.S. Cl.
USPC ....... 358/1.15; 358/1.14; 358/1.18; 358/3.28; 358/1.9; 358/1.1; 382/100; 382/167

(58) Field of Classification Search
None
See application file for complete search history.

(56) References Cited

U.S. PATENT DOCUMENTS

| 2004/0032614 | A1* | 2/2004 | Tanaka et al. ................. 358/1.15 |
| 2005/0088701 | A1* | 4/2005 | Uchida et al. ................. 358/3.28 |
| 2006/0209353 | A1* | 9/2006 | Harada et al. ................. 358/403 |
| 2006/0221368 | A1* | 10/2006 | Higuchi ........................ 358/1.13 |
| 2007/0139704 | A1* | 6/2007 | Ogura .......................... 358/1.15 |
| 2007/0171458 | A1* | 7/2007 | Kimura ........................ 358/1.15 |
| 2008/0062471 | A1* | 3/2008 | Matsuda ....................... 358/402 |
| 2008/0117478 | A1* | 5/2008 | Suzuki ......................... 358/468 |
| 2009/0303510 | A1* | 12/2009 | Uchida et al. ................. 358/1.9 |

FOREIGN PATENT DOCUMENTS

| JP | 2003-108461 A | 4/2003 |
| JP | 2008-052457 A | 3/2008 |

* cited by examiner

*Primary Examiner* — Satwant Singh
(74) *Attorney, Agent, or Firm* — Panitch Schwarze Belisario & Nadel LLP

(57) ABSTRACT

An image forming apparatus, receiving and processing data transmitted from an image processing apparatus, includes a determination unit, first requesting unit, first analysis unit, second requesting unit, second analysis unit, and image forming unit. The determination unit determines whether or not the data are receivable. The first requesting unit requests the image processing apparatus to transmit first data where the determination unit determines that the data are not receivable. The first analysis unit analyzes the first data received from the image processing apparatus. The second requesting unit requests the image processing apparatus to transmit second data serving as image information corresponding to the first data based on an analysis result provided by the first analysis unit. The second analysis unit analyzes the second data received from the image processing apparatus. The image forming unit forms an image based on an analysis result provided by the second analysis unit.

22 Claims, 14 Drawing Sheets

FIG. 4

```
[FileList]
.
./Documents
./Documents/1
./Documents/1/FixedDocument_fdoc
./Documents/1/Pages
./Documents/1/Pages/1.fpage
./Documents/1/Pages/_rels
./Documents/1/Pages/_rels/1.fpage.rels
./FixedDocumentSequence.fdseq
./Resources
./Resources/Logo.tif
./Resources/arial.ttf
./[Content_Types].xml
./_rels
./_rels/.rels
```

IMAGE FORMING APPARATUS AND IMAGE FORMING SYSTEM

BACKGROUND OF THE INVENTION

1. Field of the Invention

The present invention relates to an image forming apparatus and to an image forming system.

2. Description of Related Art

A related art image forming system includes an image forming apparatus forming images based on print data received and an image processing apparatus transmitting the print data provided based on application data (e.g., spool data) created using application software for document preparation and diagram preparation to the image forming apparatus. Such an image forming system has recently employed a method for collecting data having a folder structure into one compressed data, thereby using the compressed data as page description language (PDL) data serving as print data to be transmitted from the image processing apparatus to the image forming apparatus instead of stream formatted PDL data serving as the print data.

One example of such a method is an XML paper specification (XPS) file. For example, the XPS file includes markup data written in an extensible markup language (XML), and the markup data, image data, or font data, and the like are archived in one ZIP format.

Patent Document 1, for example, discloses an example of using the XPS file and the like as PDL data. Particularly, Patent Document 1 discloses an image forming system and an image forming apparatus forming an image based on the XPS document file transmitted using a drag and drop process with respect to a data region secured inside the image forming apparatus.

Patent Document 1: Japanese Un-examined Patent Application Publication No. 2008-052457

According to the method of using the XPS file and the like as the PDL data, however, the compressed file needs to be once transferred to the image forming apparatus and to be expanded, so that syntax analysis is performed on the file expanded. Consequently, such a method does not allow a file having a memory size exceeding the memorizing capability of the image forming apparatus to be received. In a case where the file having the excess memory size is received, the image forming apparatus needs a memory having the size more than double the memory size of the received file so as to expand the received file, causing the insufficient memory for the process by the image forming apparatus. For example, in a case where the image forming apparatus has the memory having the size of 256 M, the compressed XPS file having the memory size of more than 128 M cannot be received.

The present invention has been made to overcome occurrences of the above drawbacks, and provides an image forming apparatus and an image forming system capable of reducing (if not preventing) the possibility of insufficient memory in a case of forming an image of a compressed file having a memory size which could not be received by the related art image forming apparatus, or in a case of forming an image of a compressed file having a memory size exceeding memory capacity of the image forming apparatus thereof as a result of expansion of the compressed file.

BRIEF SUMMARY OF THE INVENTION

According to an aspect of the present invention, an image forming apparatus, receiving and processing data transmitted from an image processing apparatus, includes: a determination unit determining whether or not the data are receivable; a first requesting unit requesting the image processing apparatus to transmit first data where the determination unit determines that the data are not receivable; a first analysis unit analyzing the first data received from the image processing apparatus; a second requesting unit requesting the image processing apparatus to transmit second data serving as image information corresponding to the first data based on an analysis result provided by the first analysis unit; a second analysis unit analyzing the second data received from the image processing apparatus; and an image forming unit forming an image based on an analysis result provided by the second analysis unit.

According to another aspect of the present invention, an image forming system includes: an image forming apparatus receiving and processing data transmitted from an image processing apparatus: and the image processing apparatus. The image forming apparatus includes: a determination unit determining whether or not the data are receivable; a first requesting unit requesting the image processing apparatus to transmit first data where the determination unit determines that the data are not receivable; a first analysis unit analyzing the first data received from the image processing apparatus; a second requesting unit requesting the image processing apparatus to transmit second data serving as image information corresponding to the first data based on a analysis result provided by the first analysis unit; a second analysis unit analyzing the second data received from the image processing apparatus; and an image forming unit forming an image based on an analysis result provided by the second analysis unit. The image processing apparatus includes: a first control unit generating the first data based on the request by the first requesting unit of the image forming apparatus; a second control unit generating the second data based on the request by the second requesting unit of the image forming apparatus; and a transmission unit transmitting the data, the first data, and the second data.

According to another aspect of the present invention, an image forming system includes: an image forming apparatus receiving and processing data transmitted from an image processing apparatus; and the image processing apparatus. The image forming apparatus includes: a determination unit determining whether or not the data are receivable; a first requesting unit requesting the image processing apparatus to transmit first data where the determination unit determines that the data are not receivable; a first analysis unit analyzing the first data received from the image processing apparatus; a second requesting unit requesting the image processing apparatus to transmit second data serving as image information corresponding to the first data based on a analysis result provided by the first analysis unit; a second analysis unit analyzing the second data received from the image processing apparatus; and an image forming unit forming an image based on an analysis result provided by the second analysis unit. The image processing apparatus includes: a first control unit requesting transmission of the data from the image forming apparatus based on the request by the first requesting unit of the image forming apparatus, and generating the first data based on the data received; a second control unit generating the second data based on the request by the second requesting unit of the image forming apparatus; and a transmission unit transmitting the data, the first data, and the second data.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the present invention and many of the attendant advantage thereof will be readily obtained as the same becomes better understood by reference to the following detailed description when considered in connection with the accompanying drawings, wherein:

FIG. 4 is a schematic diagram illustrating an example of a file list;

DETAILED DESCRIPTION OF PREFERRED EMBODIMENTS

Figure 1:
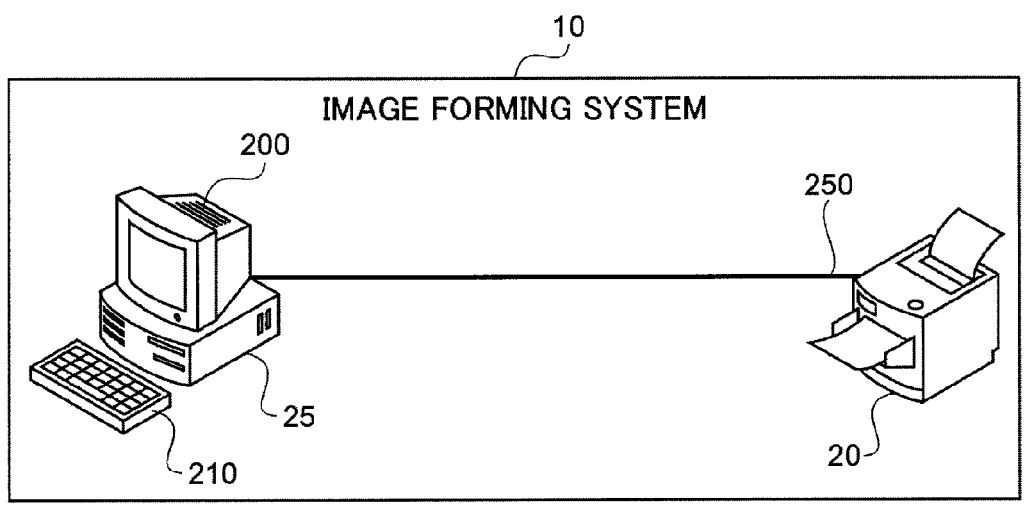
FIG. 1 is a schematic system diagram illustrating an image forming system according to a first embodiment of the present invention.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner. Preferred embodiments of the present invention are described in detail referring to the drawings, wherein like reference numerals designate identical or corresponding parts throughout the several views.

First Embodiment

Figure 2:
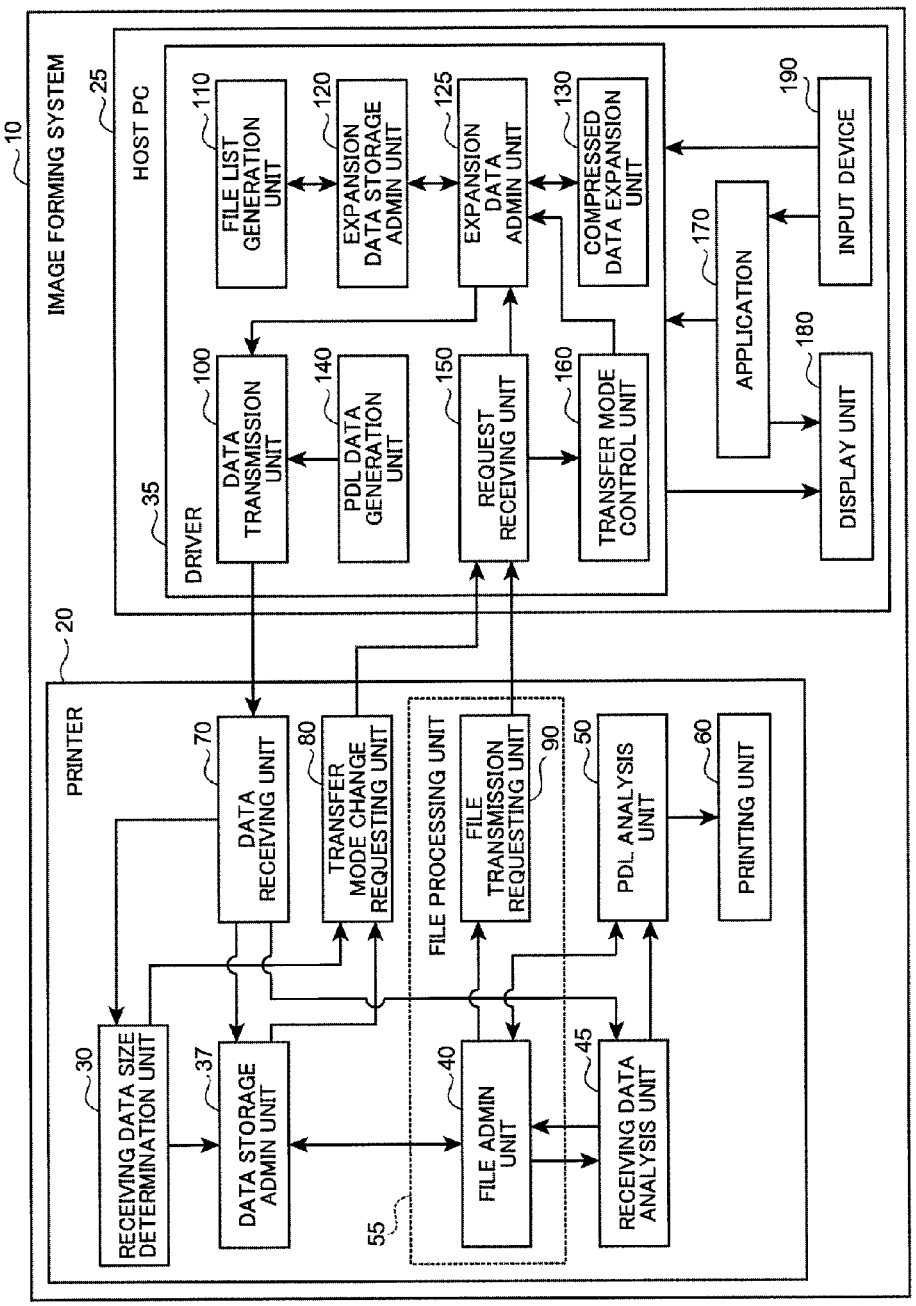
FIG. 2 is a schematic diagram illustrating an internal structure of the image forming system of FIG. 1.

Referring to FIG. 1 and FIG. 2, a description is given of an image forming system 10, having a printer 20 serving as an image forming apparatus and a host personal computer (PC) 25 serving as an image processing apparatus, according to a first embodiment.

As illustrated in a schematic system diagram of FIG. 1, the image forming system 10 includes: the printer 20; the host PC 25; a monitor 200, for example, a cathode ray tube (CRT) display or liquid crystal display (LCD) serving as a display mechanism, displaying an apparatus state of the host PC 25 or various setting input screens and the like; and a keyboard 210, serving as an input mechanism, receiving an input by a user through the various setting input screens displayed on the monitor 200. The printer 20 and the host PC 25 are connected through a communication cable 250, for example, a local area network (LAN). In a case of communication from the host PC 25 to the printer 20, a communication port of port number 9100 can be used. In a case of communication from the printer 20 to the host PC 25, on the other hand, a communication port of port number 50000 can be used. These communication ports are, for example, used for transmission control protocol and Internet protocol (TCP/IP).

The image forming system 10 with the internal structure thereof is illustrated in a schematic diagram of FIG. 2. A description of the printer 20 is now given, followed by a description of the host PC 25.

The printer 20 includes: a data receiving unit 70; a receiving data size determination unit 30; a data storage administration unit 37; a transfer mode change requesting unit 80; a receiving data analysis unit 45; a file processing unit 55 having a file administration unit 40 and a file transmission requesting unit 90; a PDL analysis unit 50; and a printing unit 60.

The data receiving unit 70 receives a file list (described later) or PDL data (described later) and the like transmitted from the host PC 25 using the communication port of port number 9100. Herein, the PDL data represent file data including printing information written therein. The printer 20 analyzes the PDL data and executes the printing process based on the analysis result.

The receiving data size determination unit 30 determines whether or not the PDL data transmitted from the host PC 25 are receivable based on a criterion in which the total memory size of the file data forming the PDL data is smaller than or equal to the maximum memory size to be stored in the printer 20. Where the PDL data are non-compressed data (e.g., where the PDL data do not undergo the compression process and are simply collected as one archive file), the memory size of the file data subsequent to an expansion process becomes substantially the same as that of the compressed file, so that an expansion process can be performed. However, since the memory size of the compressed file generally increases subsequent to the expansion process, the compressed file is not always expandable even if received. Herein, the expansion process may also be referred to as a de-compression process of the file.

The data storage administration unit 37 administers a storage medium such as random access memory (RAM, not shown) temporarily storing the PDL data received from the host PC 25.

The transfer mode change requesting unit 80, serving as a first requesting unit, requests a transfer mode change of the PDL data with respect to the driver 35 of the host PC 25 where the receiving data size determination unit 30 determines that the PDL data are not receivable. According to the first embodiment, the transfer mode includes: a "normal data transfer mode" by which the driver 35 transfers the PDL data as they are; and a "requested file transfer mode" by which the compressed file forming the PDL data is once expanded in the driver 35, so that a certain expansion file requested by the printer 20 among expansion files as second data is transferred when needed. Herein, the expansion file or files, serving as second data, represent the file or files undergo the expansion process, that is, the file or files subsequent to the expansion.

Figure 3:
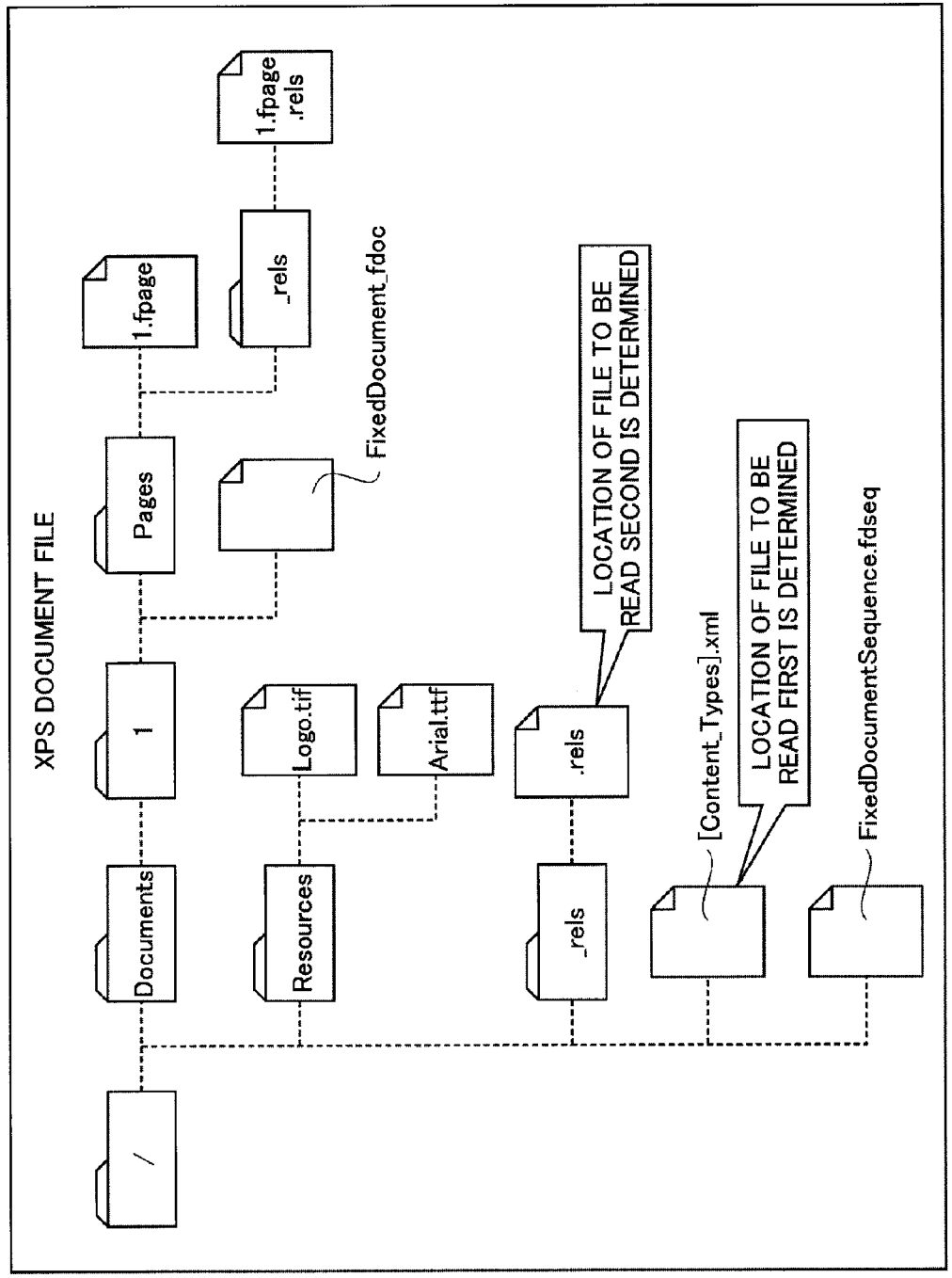
FIG. 3 is a schematic diagram illustrating an example of PDL data.

The receiving data analysis unit 45 serves as a first analysis unit and analyzes the file list, serving as first data, transmitted from the driver 35 based on the transfer mode change request made by the transfer mode change requesting unit 80. Herein, the file list represents a list of file paths provided by expanding the PDL data in a temporary folder of the host PC 25 and then rooting the temporary folder. Particularly, the file list generated with respect to the PDL data as illustrated in FIG. 3 can be generated as a list as illustrated in FIG. 4.

The file processing unit 55, serving as an instruction unit, includes the file administration unit 40 and the file transmission requesting unit 90 to request the driver 35 to transmit the expansion file based on the file path written in the file list. The file administration unit 40, serving as an administration unit, administers an access to the file stored in the storage medium (not shown) or the expansion file administered by the driver 35 according to the file list (described later). The file transmission requesting unit 90, serving as a second requesting unit, requests the driver 35 to transmit the file corresponding to the file path based on the file path written in the file list.

The PDL analysis unit 50, serving as a second analysis unit, analyzes the PDL data received.

The printing unit 60, serving as an image forming unit, for example, includes a print engine employing an electrophotographic method to execute a printing process based on the analysis result provided by the PDL analysis unit 50.

In addition to the above, the printer 20 includes: a print control unit including a read only memory (ROM), a timer, and a central processing unit (CPU) controlling the printer 20 as a whole; an interface control unit controlling the sequence of the printer 20 as a whole by receipt of a control command and executing the printing operation; a display unit including a display device, for example, a liquid crystal display (LCD), to display a state of the printer 20; an operation unit including an input mechanism, for example, a touch panel, to receive an instruction from the user; various sensors such as a sheet position detection sensor, a temperature humidity sensor, and a density sensor to monitor the operation state of the printer 20; and a power source supplying the electric power to each component included in the printer 20.

A description is now given of the host PC 25. As illustrated in FIG. 2, the host PC 25 includes: a display unit 180, serving as an output unit, allowing an apparatus state or various setting input screens and the like to be displayed with respect to an external display device such as the monitor 200; an input device 190, serving as an input unit, receiving an input by the user with respect to various setting input screens displayed on the monitor 200 through the keyboard 210 and the like; an application 170 for document preparation and diagram preparation; and the driver 35, serving as a printer driver supporting the printer 20, generating the PDL data printable by the printer 20 based on spool data output from the application 170. Herein, the spool data represent intermediate data of the print data output by the application 170 with respect to the driver 35.

The driver 35 is now described in detail. The driver 35 includes: a PDL data generation unit 140; a data transmission unit 100; a request receiving unit 150; a transfer mode control unit 160; a compressed data expansion unit 130; an expansion data storage administration unit 120; a file list generation unit 110; and an expansion data administration unit 125.

The PDL data generation unit 140 generates the PDL data based on the spool data output from the application 170, and allows the generated PDL data to be stored in a storage medium (not shown).

The data transmission unit 100, serving as a transmission unit, transmits the PDL data generated by the PDL data generation unit 140 and stored in the storage medium (not shown) or the file list and the like with respect to the communication port of the port number 9100 for the printer 20.

The request receiving unit 150 receives, for example, the transfer mode change request and the like from the printer 20 through the communication port of the port number 50000.

The transfer mode control unit 160 changes the transfer mode of the PDL data based on the transfer mode change request from the printer 20.

The compressed data expansion unit 130 expands the compressed file forming the PDL data, that is, the compressed data expansion unit 130 performs the expansion process. According to the first embodiment, the expansion process is assumed to be performed to the file compressed in a ZIP file format. However, the expansion process may be performed to a file compressed in various formats, for example, a LZH format and TAR format.

The expansion data storage administration unit 120 administers, for example, the storage medium such as a hard disk drive (HDD, not shown) storing the expansion file.

The file list generation unit 110, serving as a first control unit, generating the file list according to a directory structure of the expansion files stored in the storage medium (not shown).

The expansion data administration unit 125, serving as a second control unit, administers an access to the expansion file stored in the storage medium (not shown).

In addition to the components described above, the host PC 25 includes: a CPU (not shown) controlling the host PC 25 as the whole; and a communication control device, for example, a network card, controlling the storage medium such as RAM, ROM, or HDD storing a control program of the host PC 25 or the driver 35, and the communication port of the port number 9100. The CPU controls these components, so that the host PC 25 functions.

The operation according to the first embodiment is described with reference to FIGS. 2 through 9. According to the first embodiment, an XPS file is used as compressed PDL data.

Figure 5:
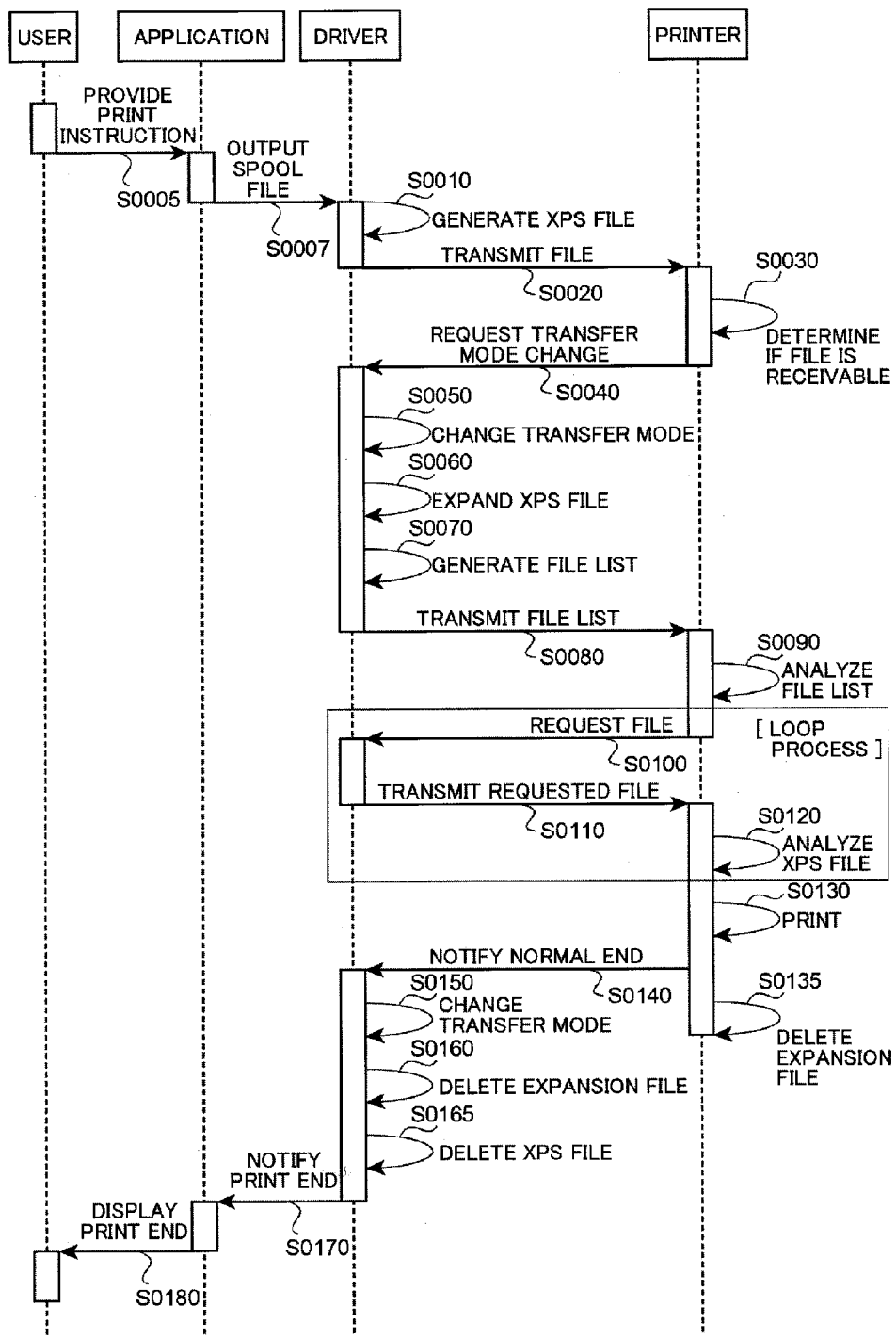
FIG. 5 is a flowchart illustrating an example operating procedure of the image forming system as a whole.

Referring to a flowchart of FIG. 5, a description is given of an example operating procedure of the image forming system 10 as a whole.

In step S0005, the user of the host PC 25 provides a print execution instruction with respect to the application 170 through the input device 190. Upon receipt of the print execution instruction, the application 170 outputs the spool data with respect to the driver 35 (step S0007).

The PDL data generation unit 140 generates the XPS file based on the spool data upon receiving the input of the spool data (step S0010). The XPS file generated by the PDL data generation unit 140 is structured as illustrated in FIG. 3 and is, for example, compressed in the ZIP format.

Next, the data transmission unit 100 transmits the XPS file generated by the PDL data generation unit 140 to the printer 20 through the communication port of the port number 9100 (step S0020).

The printer 20 has the data receiving unit 70 receiving the XPS file transmitted by the data transmission unit 100 through the communication port of the port number 9100. When the data receiving unit 70 receives the XPS file, the receiving data size determination unit 30 determines whether or not all of the XPS files are receivable (step S0030). Where all of the XPS files are not receivable (No in step S0030), the receiving data size determination unit 30 notifies the transfer mode change requesting unit 80 accordingly.

Upon receipt of the notice from the receiving data size determination unit 30, the transfer mode change requesting unit 80 transmits the transfer mode change request with respect to the request receiving unit 150 of the host PC 25 (step S0040). Upon receipt of the transfer mode change request, the request receiving unit 150 notifies the transfer mode control unit 160 and the expansion data administration unit 125 accordingly.

The transfer mode control unit 160 changes the transfer mode from the "normal data transfer mode" to the "requested file transfer mode" upon receiving the notice of the transfer mode change request from the request receiving unit 150 (step S0050). The expansion data administration 125 provides an instruction with respect to the compressed data expansion unit 130 to expand the XPS file previously attempted to be transmitted. The compressed data expansion unit 130 expands the XPS file upon receiving the expansion instruction of the XPS file from the expansion data administration unit 125 (step S0060).

The expansion data administration unit 125 provides an instruction with respect to the expansion data storage administration unit 120 to allow the XPS file expanded by the compressed data expansion unit 130 to be stored in the storage medium (not shown). The XPS file expanded by the compressed data expansion unit 130 is hereafter referred to as the expansion file. The expansion data storage administration unit 120 allows the expansion file to be stored in the storage medium (not shown) upon receipt of the instruction.

When the expansion file is stored in the storage medium (not shown), the file list generation unit 110 generates the directory structure of the expansion files as the file list as illustrated in FIG. 4 (step S0070). When the file list generation unit 110 generates the file list, the expansion data administration unit 125 provides an instruction with respect to the data transmission unit 100 to transmit the file list to the printer 20. Upon receipt of the instruction, the data transmission unit 100 transmits the file list to the printer 20 through the communication port of the port number 9100 (step S0080).

The printer 20 has the data receiving unit 70 receiving the file list transmitted by the data transmission unit 100 through the communication port of the port number 9100. When the data receiving unit 70 receives the file list, the receiving data analysis unit 45 acquires the file list through the file administration unit 40 and analyzes the file list (step S0090). The file administration unit 40 provides an instruction with respect to the file transmission requesting unit 90 to acquire a necessary expansion file (hereafter referred to as a designated expansion file) based on the analysis result provided by the receiving data analysis unit 45. Upon receipt of the instruction, the file transmission requesting unit 90 transmits a request for acquisition of the designated expansion file with respect to the request receiving unit 150 of the host PC 25 (step S0010).

The request receiving unit 150 notifies the expansion data administration unit 125 of a file name of the designated expansion file upon receipt of the request for acquisition of the designated expansion file. Upon receipt of the notice, the expansion data administration unit 125 provides an instruction to the data transmission unit 100 to transmit the expansion file corresponding to the designated expansion file name stored in the storage medium (not shown) to the printer 20. Upon receipt of the instruction, the data transmission unit 100 transmits the expansion file to the printer 20 through the communication port of the port number 9100 (step S0110).

The printer 20 has the data receiving unit 70 receiving the expansion file transmitted by the data transmission unit 100 through the communication port of the port number 9100. When the data receiving unit 70 receives the expansion file, the PDL analysis unit 50 analyzes the expansion file received (step S0120). Moreover, the file administration unit 40 provides an instruction with respect to the file transmission requesting unit 90 to acquire the necessary designated expansion file based on the analysis result provided by the receiving data analysis unit 45 as may be needed.

When the PDL analysis unit 50 finishes the analyses of all the expansion files received, the printing unit 60 executes the printing process based on the analysis result (step S0130). When the printing unit 60 finishes the printing process, the file administration unit 40 provides an instruction with respect to the file transmission requesting unit 90 to notify that the process is finished in a normal manner. Upon receipt of the instruction, the file transmission requesting unit 90 transmits a "normal end notice" with respect to the request receiving unit 150 of the host PC 25 (step S0140).

Upon receipt of the "normal end notice," the request receiving unit 150 provides instructions to the transfer mode control unit 160 and the expansion data administration unit 125 to change the transfer mode and delete the expansion file, respectively.

Upon receipt of the instruction, the transfer mode control unit 160 changes the transfer mode from the "requested file transfer mode" to the "normal data transfer mode" (step S0150). In step S0160, the expansion data administration unit 125 allows the expansion data storage administration unit 120 to delete the expansion file stored in the storage medium (not shown).

The driver 35 allows the XPS file stored in the storage medium (not shown) to be deleted (step S0165) and notifies the application 170 of the print completion (step S0170).

Upon receipt of the print completion notice, the application 170 allows a message indicating the print completion through the display unit 190 (step S0180).

Figure 6:
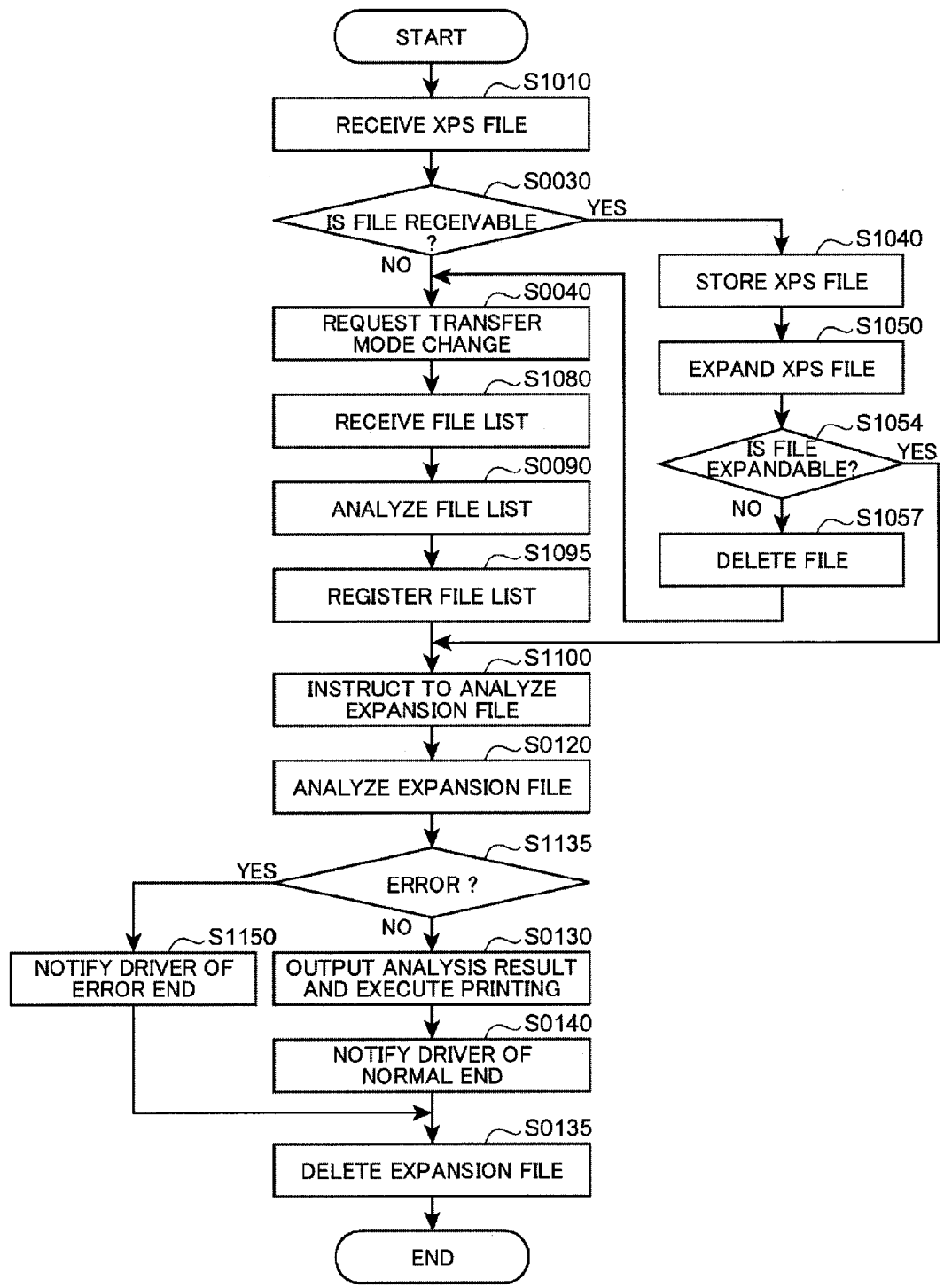
FIG. 6 is a flowchart illustrating an example operating procedure of a printer.

Referring to a flowchart of FIG. 6, a description is given of an example operating procedure of the printer 20.

When the XPS files is received through the data requesting unit 70 (step S1010), the receiving data size determination unit 30 compares the total memory size of the XPS files ever received and a memory size threshold that is set beforehand, and determines whether or not all of the XPS files are receivable (step S0030). According to the first embodiment, the threshold represents the half of the maximum memory size of the storage medium (not shown) administered by the data storage administration unit 37. Where the total memory size of the XPS files ever received is below the threshold, the receiving data size determination unit 30 determines that all of the XPS files are receivable (Yes in step S0030). Where the total memory size of the XPS files ever received is greater than or equal to the threshold, the receiving data size determination unit 30 determines that the all of the XPS files are not receivable (No in step S0030).

Where all of the XPS files are receivable (Yes in step S0030), the data size determination unit 30 provides an instruction to the data storage administration unit 37 to store the received XPS files in the storage medium (not shown). In step S1040, the data storage administration unit 37 allows the received XPS files to be stored in the storage medium (not shown) upon receipt of the instruction from the data size determination unit 30.

When all of the XPS files are stored in the recording medium (not shown), a file data expansion unit (not shown) executes the expansion process of the XPS files (step S1050). According to the first embodiment, the expansion process with respect to the XPS files is, for example, an UNZIP process. Herein, in a case where the XPS files are not stored in the storage medium (not shown) due to an increase in the memory size subsequent to the expansion process, that is, in a case where the expansion process is not performable (No in step S1057), the data storage administration unit 37 deletes the received XPS files (step S1057) and notifies the transfer mode change requesting unit 80 of the transfer mode change request. Where the expansion process is performable (Yes in step S1054), on the other hand, the data storage administration unit 37 provides an instruction with respect to the PDL analysis unit 50 to execute analysis of the expansion file (step S1100). Upon receipt of the instruction, the PDL analysis unit 50 analyzes the expansion file (step S0120).

Where the data size determination unit 30 determines that all of the XPS files are not receivable (No in step S0030), or where the expansion process is not performable although all of the XPS files are received (No in step S 1054), the receiving data size determination unit 30 or the data storage administration unit 37 notifies the transfer mode change requesting unit 80 of the transfer mode change request. Upon receipt of the notice, the transfer mode change requesting unit 80 transmits the change request with respect to the request receiving unit 150 of the host PC 25 such that the transfer mode is changed to the "requested file transfer mode" (step S0040).

When the transfer mode change requesting unit 80 transmits the transfer mode change request, the file list is transmitted from the data transmission unit 100 of the host PC 25, and the data receiving unit 70 receives the file list through the communication port of the port number 9100 (step S1080).

When the data receiving unit 70 receives the file list, the receiving data analysis unit 45 acquires the file list through the file administration unit 40 and analyzes the file list (step S0090). Where the received data are determined to be the file list based on the analysis, the receiving data analysis unit 45 allows the file list to be registered in the file administration unit 40 (step S1095) and provides an instruction to the PDL data analysis unit 50 to analyze the expansion file acquired through the file administration unit 40 from the host PC 25 based on the file list (step S1100).

Upon receipt of the instruction, the PDL analysis unit 50 analyzes the expansion file (step S0120). The PDL analysis unit 50 determines whether or not an error has occurred in the course of the analysis (step S1135). Where the error has occurred (Yes in step S1135), the PDL analysis unit 50 notifies the file administration unit 40 accordingly. Upon receipt of the notice, the file administration unit 40 notifies the driver 35 of the "error end" (step S1150). Herein, the "error end" message indicates that the process needs to be finished due to the error occurrence. The file administration unit 40 allows the expansion files stored in the storage medium (not shown) to be deleted (step S0135), and the flow ends. Where the error does not occur (No in step S1135), on the other hand, the PDL analysis unit 50 outputs the analysis result with respect to the printing unit 60 and allows the printing unit 60 to execute the printing process (step S0130). The PDL analysis unit 50 notifies the file administration unit 40 of the printing process execution. Upon receipt of the notice, the file administration unit 40 notifies the driver 35 of "normal end" (step S0140). The file administration unit 40 allows the expansion files stored in the storage medium (not shown) to be deleted (step S0135), and the flow ends.

Figure 7:
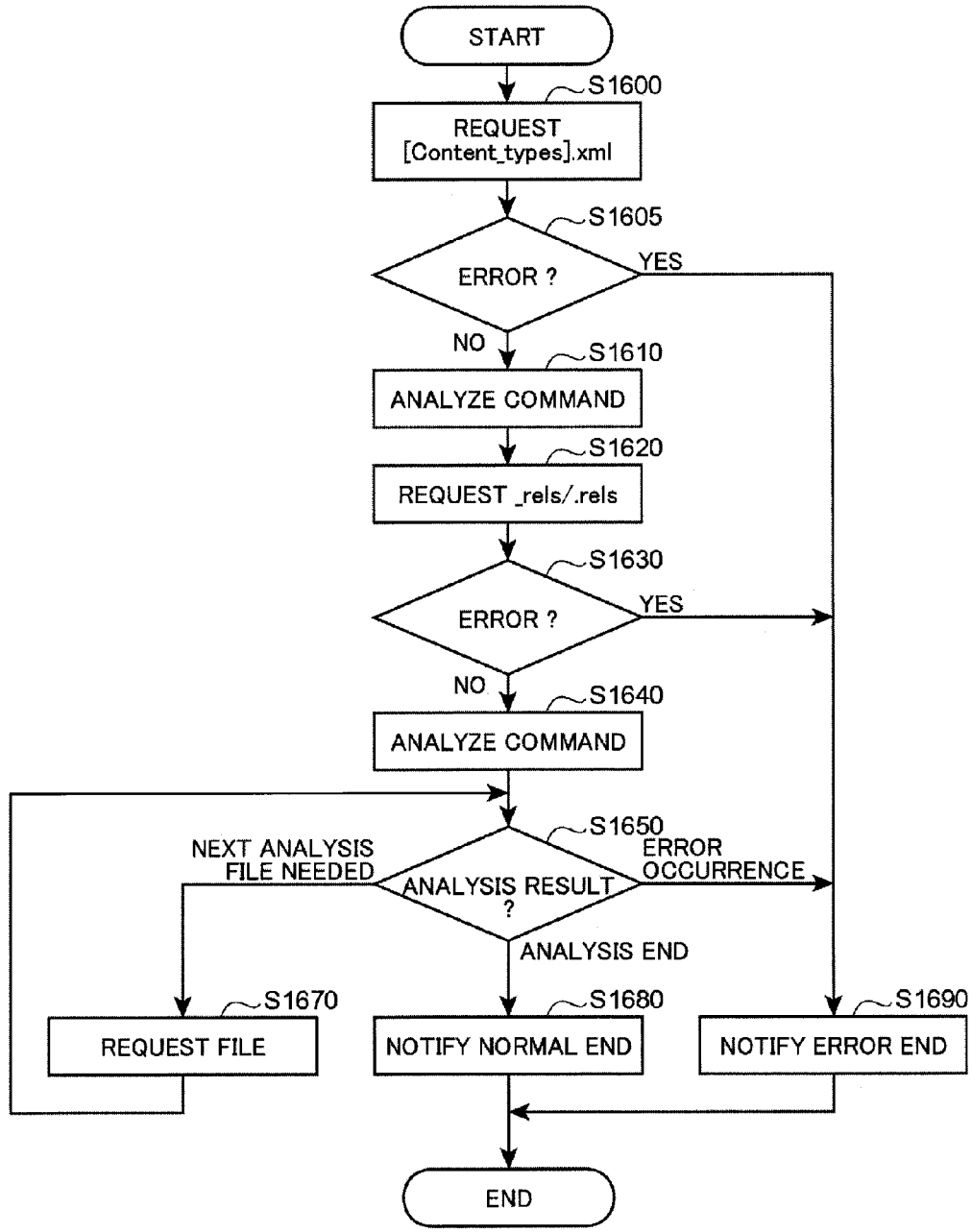
FIG. 7 is another flowchart illustrating an example procedure for analysis operation by a PDL analysis unit.

Referring to a flowchart of FIG. 7, a description is given of an example analysis procedure by the PDL analysis unit 50.

In a case where the expansion file is analyzed, the PDL analysis unit 50 requests the file administration unit 40 to acquire a "[Content_Types].xml" file (step S1600). In the "[Content_Types].xml" file, an extension and a format of the data to be included in a target file data are defined. Therefore, the analysis of such file can hereafter determine a type of the file to be analyzed by the PDL analysis unit 50 according to the extension.

Upon receipt of the request for acquisition of the "[Content_Types].xml" file by the PDL analysis unit 50, the file administration unit 40 allows the data storage administration unit 37 to confirm whether or not the file is stored in the storage medium (not shown) in step S1605. Where the data storage administration unit 37 confirms that the file is not stored, that is, a result of the acquisition request made by the PDL analysis unit 50 represents the error (Yes in step S1605), the file administration unit 40 notifies the following process of the "error end" (steps S1690), and the flow ends.

Where the "[Content_Types].xml" file is stored in the storage medium (not shown), that is, a result of the acquisition request made by the PDL analysis unit 50 represents the normal (No in step S1605), on the other hand, the PDL analysis unit 50 acquires the "[Content_Types].xml" file through the file administration unit 40 and executes a command analysis (step S1640).

Upon finishing the command analysis of the "[Content_Types].xml" file, the PDL analysis unit 50 requests the file administration unit 40 to acquire a "_rels/.rels" file (step S1620). The "_rels/sels" file includes a path to a file to be analyzed next.

Upon receipt of the request for acquisition of the "_rels/sels" file by the PDL analysis unit 50, the file administration unit 40 allows the data storage administration unit 37 to confirm whether or not the file is stored in the storage unit (not shown) in step S1630. Where the data storage administration unit 37 confirms that the file is not stored, that is, the result of the acquisition request made by the PDL analysis unit 50 represents the error (Yes in steps 1630), the file administration unit 40 notifies the following process of the "error end" (step S1690), and the flow ends.

Where the "_rels/sels" file is stored in the storage medium (not shown), that is, the result of the acquisition request made by the PDL analysis unit 50 represents the normal (No in steps 1630), the PDL analysis unit 50 acquires the "_rels/sels" file through the file administration unit 40 and executes the command analysis (step S1640).

Upon finishing the command analysis of the "_rels/sels" file, the PDL analysis unit 50 checks the analysis result (step S1650). Where the error has occurred in the course of the analysis (error occurrence in step S1650), the "error end" is notified to the following process (step S1690), and the flow ends. Where a next file to be analyzed is needed based on the analysis result (next analysis file needed in step S1650), the PDL analysis unit 50 requests the file administration unit 40 to acquire a target file to be analyzed next (step S1670), and a flow returns to step S1650 until the analysis process is finished. That is, the flow repeatedly returns to step S1650 until no file to be analyzed next remains. Where the analysis process is finished (analysis end in step S1650), the PDL analysis unit 50 notifies the following process of the "normal end" (step S1680), and the flow ends.

Figure 8:
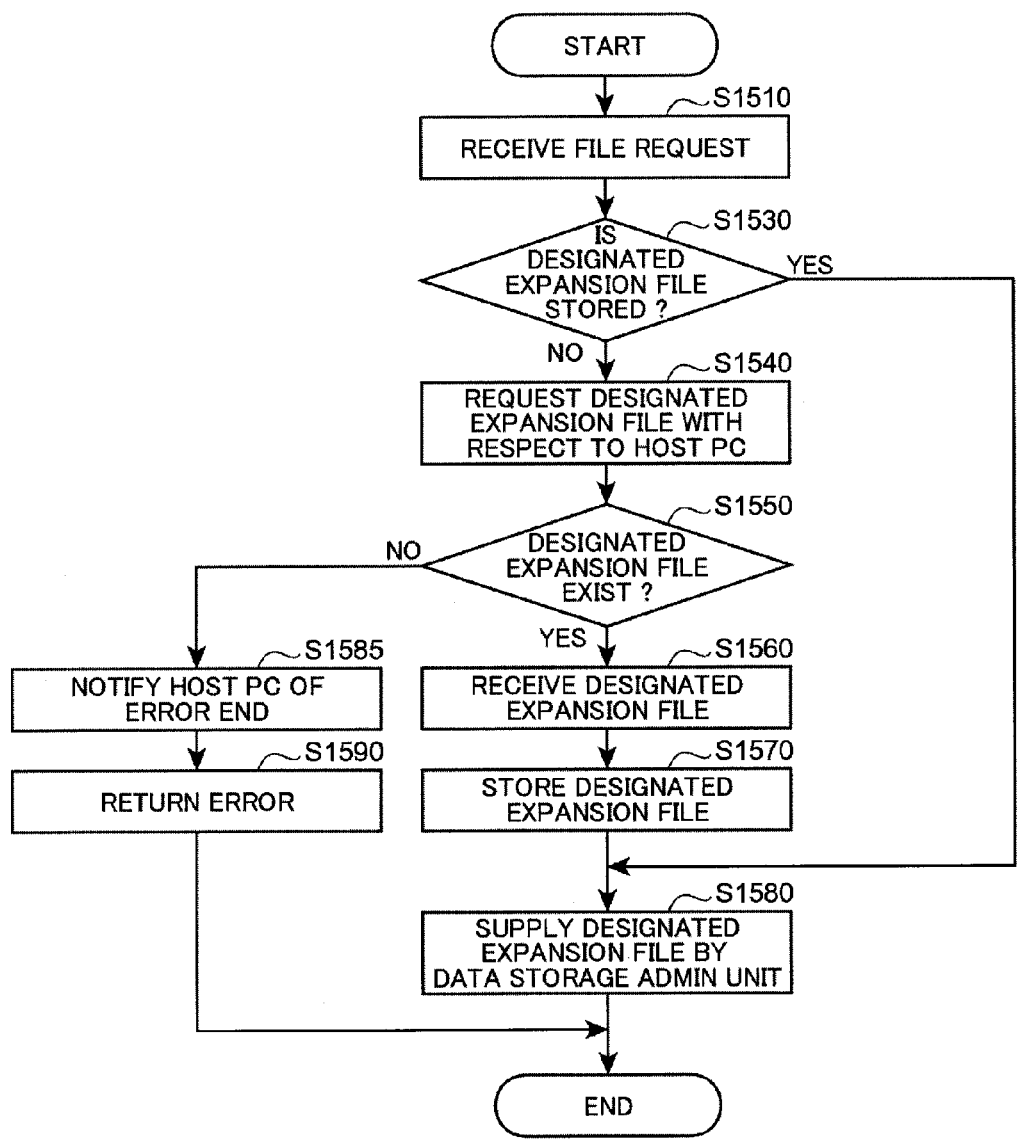
FIG. 8 is yet another flowchart illustrating an example operating procedure of a file administration unit.

Referring to a flowchart of FIG. 8, an example operating procedure by the file administration unit 40 is described. Particularly, a description is given of the example operating procedure of the file administration unit 40 in the course of the analysis process by the PDL analysis unit 50.

When the file administration unit 40 receives the acquisition request of the designated expansion file from the PDL analysis unit 50 (step S1510), the file administration unit 40 allows the data storage administration unit 37 to confirm whether or not the designated expansion file is stored in the storage medium (not shown) in the step S1530. Where the designated expansion file is stored (Yes in step S1530), the file administration unit 40 provides the designated expansion file to the PDL analysis unit 50 through the data storage administration unit 37 (step S1580). Where the designated expansion file requested by the PDL analysis unit 50 is not stored in the storage medium (No in step S1530), the file administration unit 40 provides an instruction with respect to the file transmission requesting unit 90 to acquire the designated expansion file. Upon receipt of the instruction, the file transmission requesting unit 90 transmits a request for acquisition of the designated expansion file to the request receiving unit 150 of the host PC 25 (step S1540).

Upon receipt of the acquisition request of the designated expansion file, the request receiving 150 notifies the expansion data administration unit 125 of a file name of the designated expansion file. In step S1550, the presence or absence of the expansion file corresponding to the designated expansion file name is confirmed, that is, whether or not the expansion file corresponding to the designated expansion file name is stored in the storage medium (not shown). Where the expansion file corresponding to the designated expansion file name is stored in the storage medium (Yes in S1550), the expansion data administration unit 125 provides an instruction to the data transmission unit 100 to transmit the designated expansion file. Upon receipt of the instruction, the data transmission unit 100 transmits the designated expansion file. In step S1560, the file administration unit 40 receives the designated expansion file transmitted from the data transmission unit 100. The file administration unit 40 allows the designated expansion file to be stored in the storage medium (not shown) through the data storage administration unit 37 (step S1570) and allows the designated expansion file to be provided to the PDL analysis unit 50 (step S1580).

Where the expansion file corresponding to the designated expansion file name is not stored in the storage medium (No in S1550), the expansion data administration unit 125 provides an instruction to the data transmission unit 100 to notify the printer 20 accordingly. Upon receipt of the notice, the data transmission unit 100 notifies the printer 20 having the file administration unit 40 of non-existence of the designated expansion file. Subsequently, the file administration unit 40 notifies the host PC 25 of the "error end" (step S1585), and the error is returned with respect to the PDL analysis unit 50 (step S1590).

Figure 9:
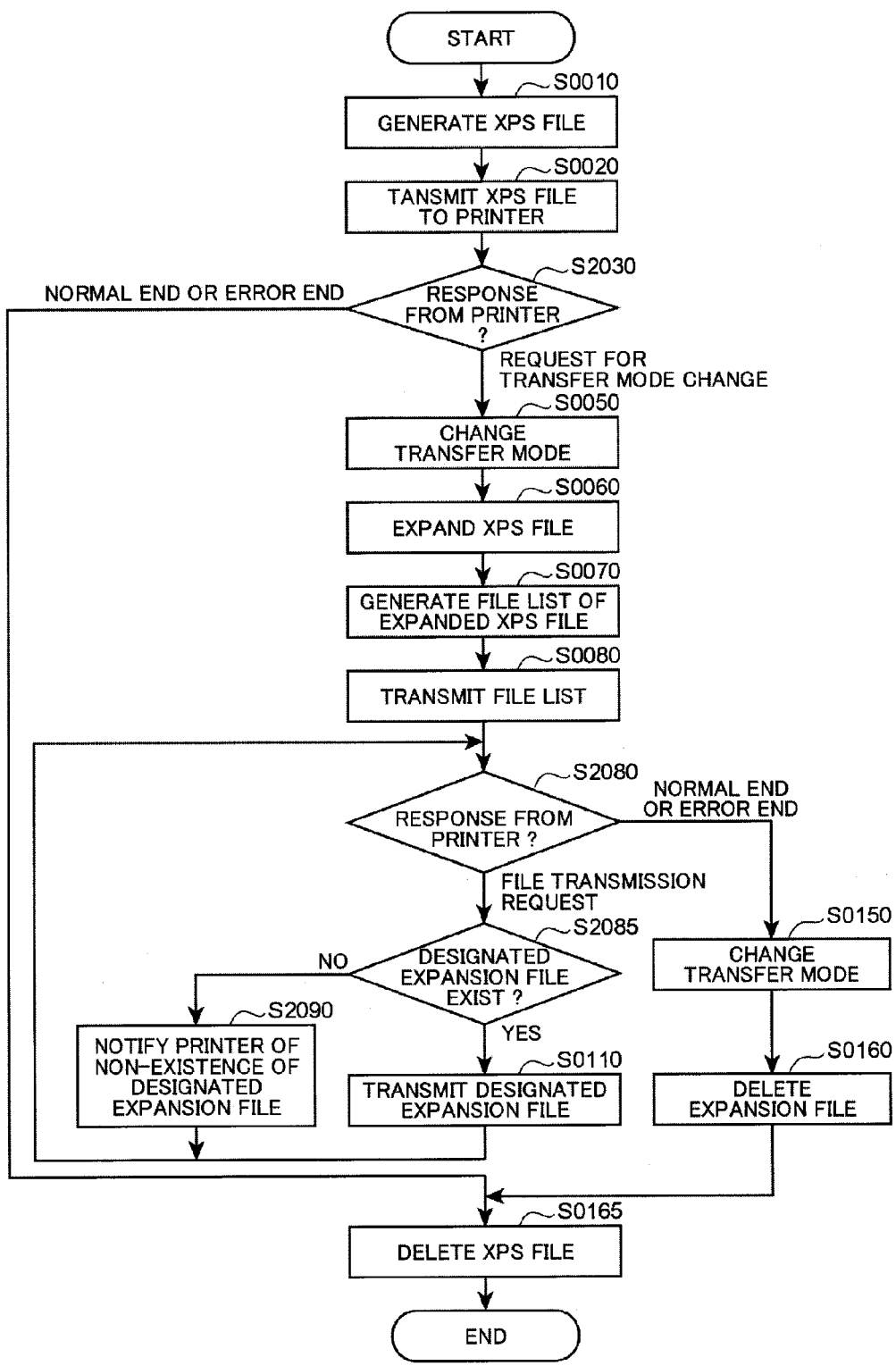
FIG. 9 is a flowchart illustrating an example operating procedure of a driver.

Referring to a flowchart of FIG. 9, a description is given of an example operating procedure by the driver 35.

When the spool data are input from the application 170, the PDL generation unit 140 included in the driver 35 generates the XPS file based on the spool data (step S0010). Subsequently, the data transmission unit 100 transmits the XPS file generated by the PDL generation unit 140 with respect to the printer 20 through the communication port of the port number 9100 (step S0020).

The driver 35 is on standby until a response from the printer 20 is received (step S2030). Where the response from the printer 20 is the "normal end" or the "error end" (normal end or error end in step S2030), the driver 35 allows the XPS file to be deleted (step S0165), and the flow ends.

Where the response from the printer 20 is the transfer mode change request provided by the transfer mode change requesting unit 80 (request for transfer mode change in step S2030), the request receiving unit 150 notifies the transfer mode control unit 160 and the expansion data administration unit 125 accordingly.

Upon receipt of the notice of the transfer mode change request from the request receiving unit 150, the transfer mode control unit 160 changes the transfer mode (step S0050). The expansion data administration unit 125 provides an instruction with respect to the compressed data expansion unit 130 to expand the XPS file previously attempted to be transmitted. Upon receipt of the instruction, the compressed data expansion unit 130 expands the XPS file (step S0060).

The expansion data administration unit 125 provides an instruction with respect to the expansion data storage administration unit 120 to store the expansion file expanded by the compressed data expansion unit 130 in the storage medium (not shown). Accordingly, the expansion data storage administration unit 120 allows the expansion file to be stored in the storage medium (not shown).

When the expansion file is stored in the storage medium (not shown), the file list generation unit 110 generates the directory structure of the expansion files as the file list (step S0070). When the file list generation unit 110 generates the file list, the expansion data administration unit 125 provides an instruction to the data transmission unit 100 to transmit the file list to the printer 20. Upon receipt of the instruction, the data transmission unit 100 transmits the file list with respect to the printer 20 through the communication port of the port number 9100 (step S0080).

The driver 35 is on stand by until the response from the printer 20 is received. Where the "normal end" or "error end" message is received from the printer 20 (normal end or error end in step S2080), the request receiving unit 150 provides instructions to the transfer mode control unit 160 and the expansion data administration unit 125 to change the transfer mode and to delete the expansion file, respectively. Upon receipt of the instruction, the transfer mode control unit 160 changes the transfer mode (step S0150), and the expansion data administration unit 125 allows the expansion file to be deleted (step S0160). Subsequently, the driver 35 allows the XPS file to be deleted (step S0165), and the flow ends.

Where the request for the designated expansion file transmission is received from the printer 20 (file transmission request in step S2080), on the other hand, the request receiving unit 150 notifies the expansion administration unit 125 of the file name of the designated expansion file. In a following step S2085, the presence or absence of the expansion file corresponding to the designated expansion file name is confirmed, that is, whether or not the expansion file corresponding to the designated expansion file name is stored in the storage medium (not shown). Where the expansion file corresponding to the designated expansion file name is stored in the storage medium (Yes in step S2085), the expansion data administration unit 125 provides an instruction to the data transmission unit 100 to transmit the designated expansion file to the printer 20 upon receipt of the notice of the designated expansion file name. Accordingly, the data transmission unit 100 transmits the designated expansion file (step S0110), and the flow returns to step S2080. Where the expansion file corresponding to the designated expansion file name is not stored in the storage medium (No in step S2085), on the other hand, the printer 20 is notified of "non-existence of the designated expansion file" (step S2090), and the flow returns to step 52080.

According to the first embodiment, the communication port of the port number 50000 is employed for communication from the printer 20 to the host PC 25 while the communication port of the port number 9100 is employed for communication from the host PC 25 to the printer 20. However, any port number may be employed as long as the port number is not reserved beforehand.

According to the first embodiment described above, the compressed PDL data are expanded on the side of the host PC 25, and the printer 20 can request the side of the host PC 25 to provide the necessary file on a file basis (i.e., file by file) as needed. Therefore, the printer 20 can reduce (if not prevent) the possibility of an insufficient memory even in a case of printing the compressed PDL data having a memory size which could not be received by the printer, or in a case of printing the compressed PDL data having a memory size exceeding the memory capacity of the printer as a result of the file expansion, so that the printing operation can be executed.

Second Embodiment

A description is given of a second embodiment of the present invention. According to an image forming system 1000 of the second embodiment, an application independent of a driver receives a request from a printer unlike the first embodiment described above. Components and/or configurations of the image forming system 1000 that differ from the image forming system 10 in first embodiment will be described. Like components will be given the same reference numerals as above first embodiment, and description thereof will be omitted.

Figure 10:
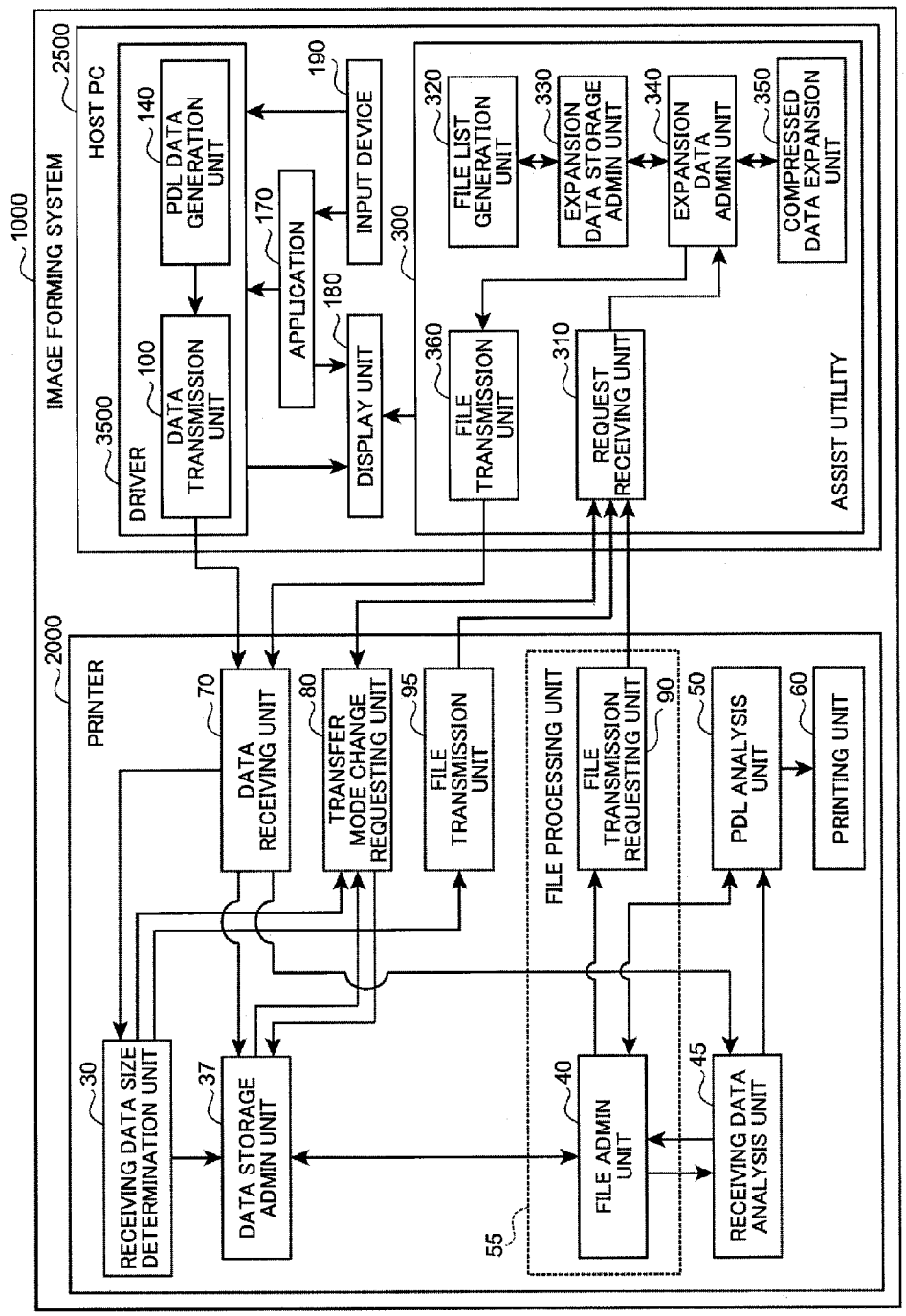
FIG. 10 is a schematic diagram illustrating an internal structure of an image forming system according to a second embodiment of the present invention.

Referring to FIG. 10, the image forming system 1000 according to the second embodiment is illustrated in a schematic diagram.

A printer 2000 includes a file transmission unit 95 in addition to the configurations similar to the printer 20 of the first embodiment. The file transmission unit 95 transmits file data stored in a storage medium (not shown) to an external unit based on an instruction provided by a data storage administration unit 37.

A host PC 2500 includes an assist utility 300 in addition to the configurations similar to the host PC 25 of the first embodiment. The assist utility 300, serving as an application, supports the printing process with respect to the printer 2000 and provides services through communication ports of the port numbers 9100 and 50000.

A driver 3500 includes a PDL data generation unit 140 and a data transmission unit 100.

The PDL data generation unit 140 generates PDL data based on spool data output from an application 170, and allows the PDL data to be stored in the storage medium (not shown).

The data transmission unit 100 transmits the PDL data generated by the PDL data generation unit 140 and stored in the storage medium (not shown) or a file list and the like with respect to the printer 2000 through communication port of the port number 9100.

The assist utility 300 is now described in detail. The assist utility 300 includes: a request receiving unit 310; a compressed data expansion unit 350; an expansion data storage administration unit 330; a file list generation unit 320; an expansion data administration unit 340; and a file transmission unit 360.

The request receiving unit 310 receives, for example, a request from the printer 2000 through the communication port of the port number 50000.

The compressed data expansion unit 350 performs an expansion process of the compressed file forming the PDL data. According to the second embodiment, for example, the expansion process is assumed to be performed to the file compressed in a ZIP file format. However, the expansion process may be performed to a file compressed in various formats, for example, a LZH format and TAR format.

The expansion data storage administration unit 330 administers a storage medium (not shown), for example, a hard disk drive (HDD), storing the expansion file.

The file list generation unit 320, serving as a first control unit, generates the file list according to a directory structure of the expansion files stored in the storage medium (not shown).

The expansion data administration unit 340, serving as a second control unit, administers an access to the expansion file stored in the storage medium (not shown).

The file transmission unit 360, serving as a transmission unit, transmits a file requested by the printer 2000 with respect to the communication port of the port number 9100 for the printer 2000.

The operation according to the second embodiment is described with reference to FIGS. 3, 10, 11, 12, 13, and 14. According to the second embodiment, an XPS file is used as compressed PDL data.

Figure 11:
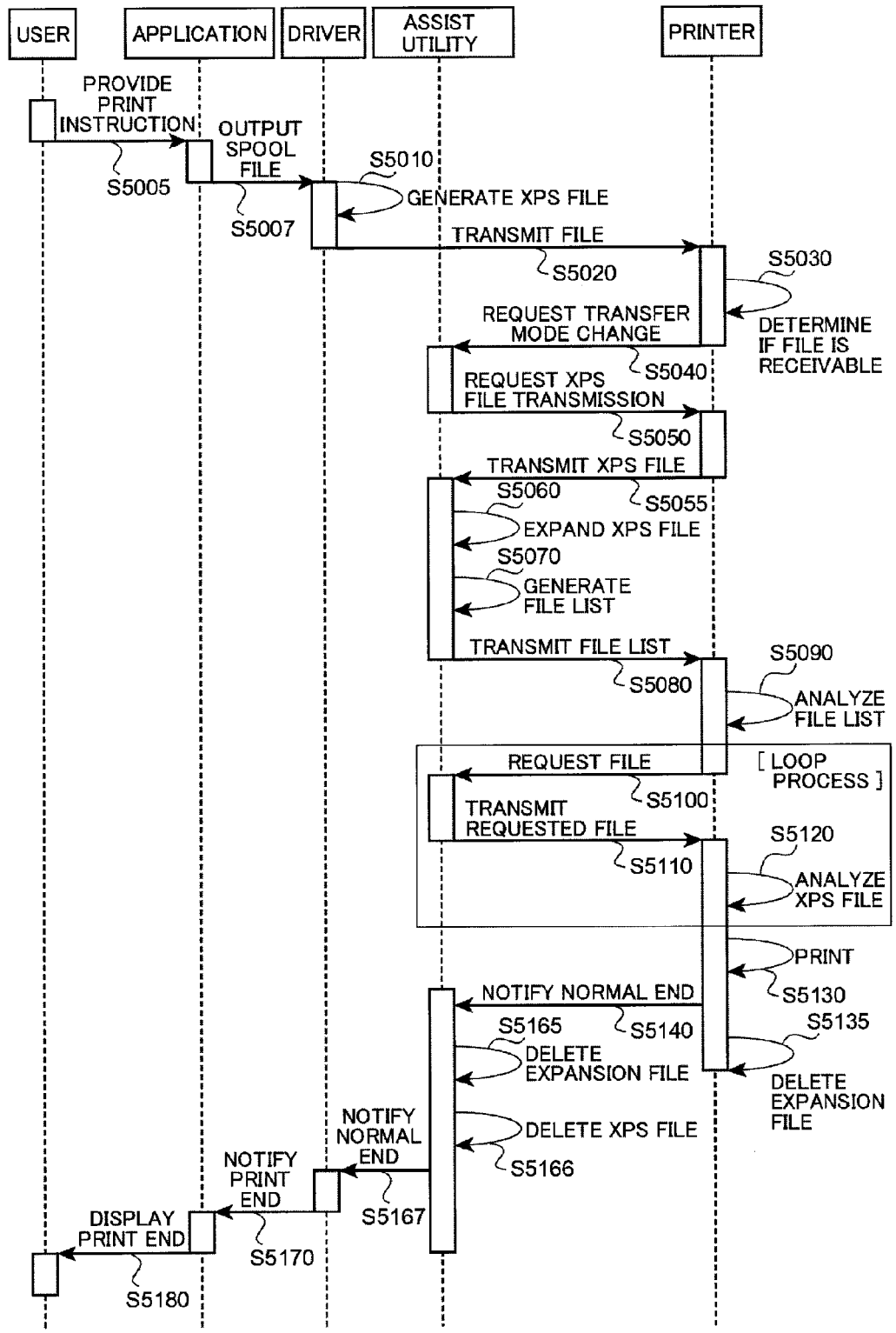
FIG. 11 is a flowchart illustrating an example operating procedure of the image forming system as a whole according to the second embodiment.

Referring to a flowchart of FIG. 11, a description is given of an example operating procedure of the image forming system 1000 as a whole.

In step S5005, a user of the host PC 25 provides a print execution instruction with respect to the application 170 through an input device 190. Upon receipt of the print execution instruction, the application 170 outputs the spool data with respect to the driver 3500 (step S5007).

The PDL data generation unit 140 generates the XPS file based on the spool data upon receiving the input of the spool data (step S5010). The XPS file generated by the PDL data generation unit 140 is structured as similar to that described above in the first embodiment as illustrated in FIG. 3 and is, for example, compressed in the ZIP format.

Subsequently, the data transmission unit 100 transmits the XPS file generated by the PDL data generation unit 140 with respect to the communication port of the port number 50000 of the printer 2000 through the communication port of the port number 9100 (step S5020).

The printer 2000 has a data receiving unit 70 receiving the XPS file transmitted by the data transmission unit 100 through the communication port of the port number 9100. When the data receiving unit 70 receives the XPS file, a receiving data size determination unit 30 determines whether or not all of the XPS files are receivable (step S5030). Where all of the XPS files are not receivable (No in step S5030), the receiving data size determination unit 30 notifies a transfer mode change requesting unit 80 accordingly.

Upon receipt of the notice from the receiving data size determination unit 30, the transfer mode change requesting unit 80 transmits the transfer mode change request with respect to the request receiving unit 310 of the host PC 2500 (step S5040). Upon receipt of the transfer mode change request, the request receiving unit 310 requests the transfer mode change requesting unit 80 to transmit the XPS file.

Upon receipt of the request from the request receiving unit 310, the transfer mode change requesting unit 80 notifies of the data storage administration unit 37 of receipt of the XPS file transfer request. Where the all of the XPS files are already received and stored in the storage medium (not shown), the data storage administration unit 37 allows the XPS files to be transmitted through the file transmission unit 95. Where all of the XPS files are not yet received, the data storage administration unit 37 allows the XPS file or files corresponding to a portion or portions already received from the driver 3500 to be transmitted and then allows the upcoming XPS files to be transmitted (step S5055).

Upon receipt of the XPS files from the file transmission unit 95 of the printer 2000, the expansion data administration unit 340 provides an instruction with respect to the compressed data expansion unit 350 to expand the received XPS files. Upon receipt of the instruction, the compressed data expansion unit 350 expands the XPS files (step S5060).

The expansion data administration unit 340 provides an instruction with respect to the expansion data storage administration unit 330 to store the expansion files expanded by the compressed data expansion unit 350 in the storage medium (not shown). Accordingly, the expansion data storage administration unit 330 allows the expansion files to be stored in the storage medium (not shown).

When the expansion files are stored in the storage medium (not shown), the file list generation unit 320 generates a directory structure of the expansion files as file list as illustrated in FIG. 4 (step S5070). When the file list generation unit 320 generates the file list, the expansion data administration unit 340 provides an instruction to the file transmission unit 360 to transmit the file list to the printer 2000. Upon receipt of the instruction, the file transmission unit 360 transmits the file list with respect to the printer 2000 through the communication port of the port number 9100 (step S5080).

The printer 2000 has the data receiving unit 70 receiving the file list transmitted by the file transmission unit 360 through the communication port of the port number 9100. When the data receiving unit 70 receives the file list, the receiving data analysis unit 45 acquires the file list through the file administration unit 40 and analyzes the file list (step S5090). The file administration unit 40 provides an instruction with respect to the file transmission requesting unit 90 to acquire a necessary expansion file (hereafter referred to as a designated expansion file) based on the analysis result provided by the receiving data analysis unit 45. Upon receipt of the instruction, the file transmission requesting unit 90 transmits the request for acquisition of the designated expansion file with respect to the request receiving unit 310 of the host PC 2500 (step S5100).

Upon receipt of the acquisition request, the request receiving unit 310 notifies the expansion data administration unit 340 of a file name of the designated expansion file. Upon receiving the notice of the designated expansion file name, the expansion data administration unit 340 provides an instruction with respect to the file transmission unit 360 to transmit the expansion file, stored in the storage medium (not shown), corresponding to the designated expansion file name to the printer 2000. Accordingly, the file transmission unit 360 transmits the designated expansion file with respect to the printer 2000 through the communication port of the port number 9100 (step S5110).

The printer 2000 has the data receiving unit 70 receiving the expansion file transmitted by the file transmission unit 360 through the communication port of the port number 9100. When the data receiving unit 70 receives the expansion file, the PDL analysis unit 50 analyzes the received expansion file (step S5120). Moreover, the file administration unit 40 provides an instruction with respect to the file transmission unit 90 to acquire the designated expansion file based on the analysis result provided by the receiving data analysis unit 45.

When the PDL analysis unit 50 finishes the analyses of all the expansion files received, the printing unit 60 executes the printing process based on the analysis result (step S5130). When the printing unit 60 finishes the printing process, the file administration unit 40 provides an instruction with respect to the file transmission requesting unit 90 to notify that the process is finished in a normal manner. Upon receipt of the instruction, the file transmission requesting unit 90 transmits a "normal end notice" with respect to the request receiving unit 310 of the host PC 2500 (step S5140).

Upon receipt of the "normal end notice," the request receiving unit 310 provides an instruction with respect to the expansion data administration unit 340 to delete the expansion file.

Upon receipt of the instruction, the expansion data administration unit 340 allows the expansion data storage administration unit 330 to delete the expansion file stored in the storage medium (not shown) in step S5165.

Subsequently, the assist utility 300 allows the XPS file stored in the storage medium (not shown) to be deleted (step S5166), and notifies the driver 3500 of the normal end (step S5167). Upon receipt of the notice, the driver 3500 notifies the application 170 of the print completion (step S5170).

Upon receipt of the print completion notice, the application 170 allows a message indicating the print completion to be displayed through the display unit 190 (step S5180).

Figure 12:
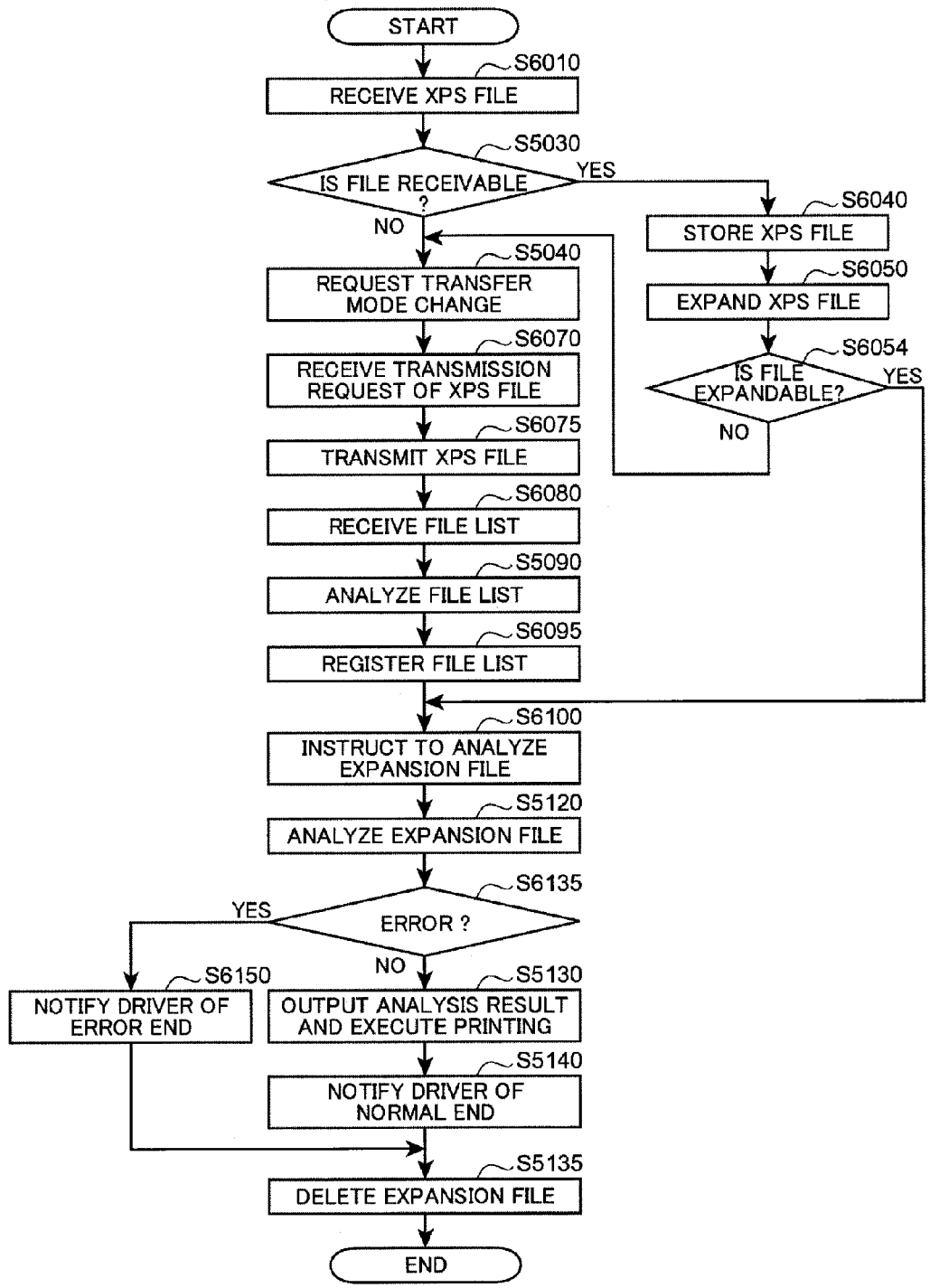
FIG. 12 is a flowchart illustrating an example operating procedure of a printer according to the second embodiment.

Referring to a flowchart of FIG. 12, a description is given of the example operating procedure of the printer 2000.

When the XPS file is received through the data receiving unit 70 (step S6010), the receiving data size determination unit 30 compares a total memory size of the XPS files ever received and a memory size threshold that is set beforehand, and determines whether or not all of the XPS files are receivable (step S5030). According to the second embodiment, the threshold represents the half of the maximum memory size of the storage medium (not shown) administered by the data storage administration unit 37. Where the total memory size of the XPS files ever received is below the threshold, the receiving data size determination unit 30 determines that all of the XPS files are receivable (Yes in step S5030). Where the total memory size of the XPS files ever received is greater than or equal to the threshold, the receiving data size determination unit 30 determines that the all of the XPS files are not receivable (No in step S5030).

Where all of the XPS files are receivable (Yes in step S5030), the data size determination unit 30 provides an instruction to the data storage administration unit 37 to store the received XPS files in the storage medium (not shown). In step S6040, the data storage administration unit 37 allows the received XPS files to be stored in the storage medium (not shown) upon receipt of the instruction from the data size determination unit 30.

When all of the XPS files are stored in the recording medium (not shown), a file data expansion unit (not shown) executes the expansion process of the XPS files (step S6050). According to the second embodiment, the expansion process with respect to the XPS files is, for example, an UNZIP process. Herein, in a case where the XPS files are not stored in the storage medium (not shown) due to an increase in the memory size subsequent to the expansion process, that is, in a case where the expansion process is not performable (No in step S6054), the data storage administration unit 37 notifies the transfer mode change requesting unit 80 of the transfer mode change request. Where the expansion process is performable (Yes in step S6054), on the other hand, the data storage administration unit 37 provides an instruction with respect to the PDL analysis unit 50 to execute analysis of the expansion file (step S6100). Upon receipt of the instruction, the PDL analysis unit 50 analyzes the expansion file (step S5120).

Where all of the XPS files are not receivable (No in step S5030), or where the expansion process is not performable although all of the XPS files are received (No in step S6054), the receiving data size determination unit 30 or the data storage administration unit 37 notifies the transfer mode change requesting unit 80 of the transfer mode change request. Upon receipt of the notice, the transfer mode change requesting unit 80 transmits the change request with respect to the request receiving unit 310 of the host PC 2500 such that the transfer mode is changed to the "requested file transfer mode" (step S5040). Upon receipt of the transfer mode change request, the request receiving unit 310 requests with respect to the transfer mode change requesting unit 80 to transmit the XPS file.

In step S6070, the transfer mode change requesting unit 80 receives the request for XPS file transmission from the request receiving unit 310 and notifies the data storage administration unit 37 accordingly. Where all of the XPS files are already received and stored in the storage medium (not shown), the data storage administration unit 37 allows the XPS files to be transmitted through the file transmission unit 35. Where all of the XPS files are not received, the data storage administration unit 37 allows the XPS file or files corresponding to a portion or portions already received from the driver 3500 to be transmitted and then allows the upcoming XPS files to be transmitted (step S6075).

When the file transmission unit 95 transmits the XPS files, the file list is transmitted from the file transmission unit 360 of the host PC 2500, so that the data receiving unit 70 receives the file list through the communication port of the port number 9100 (step S6080).

When the data receiving unit 70 receives the file list, the receiving data analysis unit 45 acquires the file list through the file administration unit 40 and analyzes the file list (step S5090). Where the received data are determined to be the file list based on the analysis, the receiving data analysis unit 45 allows the file list to be registered in the file administration unit 40 (step S9095) and provides an instruction to the PDL data analysis unit 50 to analyze the expansion file acquired through the file administration unit 40 from the host PC 2500 based on the file list (step S6100).

Upon receipt of the instruction, the PDL analysis unit 50 executes the analysis of the expansion file (step S5120). The PDL analysis unit 50 determines whether or not the error has occurred in the course of the analysis (step S6135). Where the error has occurred (Yes in step S6135), the PDL analysis unit 50 notifies the file administration unit 40 accordingly. Upon receipt of the notice, the file administration unit 40 allows an "error end" message to be transmitted to the assist utility 300 (step S6150). Herein, the "error end" message indicates that the process needs to be finished due to the error occurrence. Subsequently, the file administration unit 40 allows the expansion files stored in the storage medium (not shown) to be deleted (step S5135), and the flow ends. Where the error does not occur (No in step S6135), on the other hand, the PDL analysis unit 50 outputs the analysis result with respect to the printing unit 60 and allows the printing unit 60 to execute the printing process (step S5130). The PDL analysis unit 50 notifies the file administration unit 40 of the printing process execution. Upon receipt of the notice, the file administration unit 40 notifies the assist utility 300 of the "normal end" (step S5140). Subsequently, the file administration unit 40 allows the expansion files stored in the storage medium (not shown) to be deleted (step S5135), and the flow ends.

Figure 13:
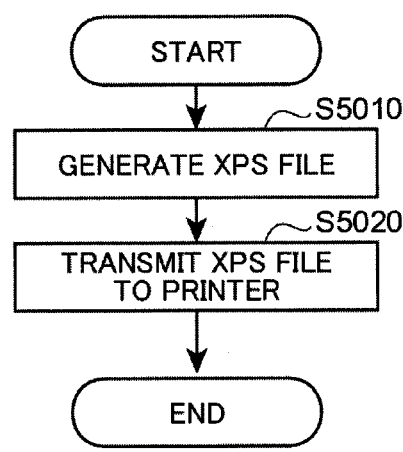
FIG. 13 is a flowchart illustrating an example operating procedure of a driver according to the second embodiment.

Referring to a flowchart of FIG. 13, a description is given of the example operating procedure by the driver 3500.

When the spool data are input from the application 170, the PDL data generation unit 140 of the driver 3500 generates the XPS file based on the spool data (step S5010). The data transmission unit 100 transmits the XPS file generated by the PDL data generation unit 140 with respect to the communication port of the port number 50000 of the printer 2000 through the communication port of the port number 9100 (step S5020).

Figure 14:
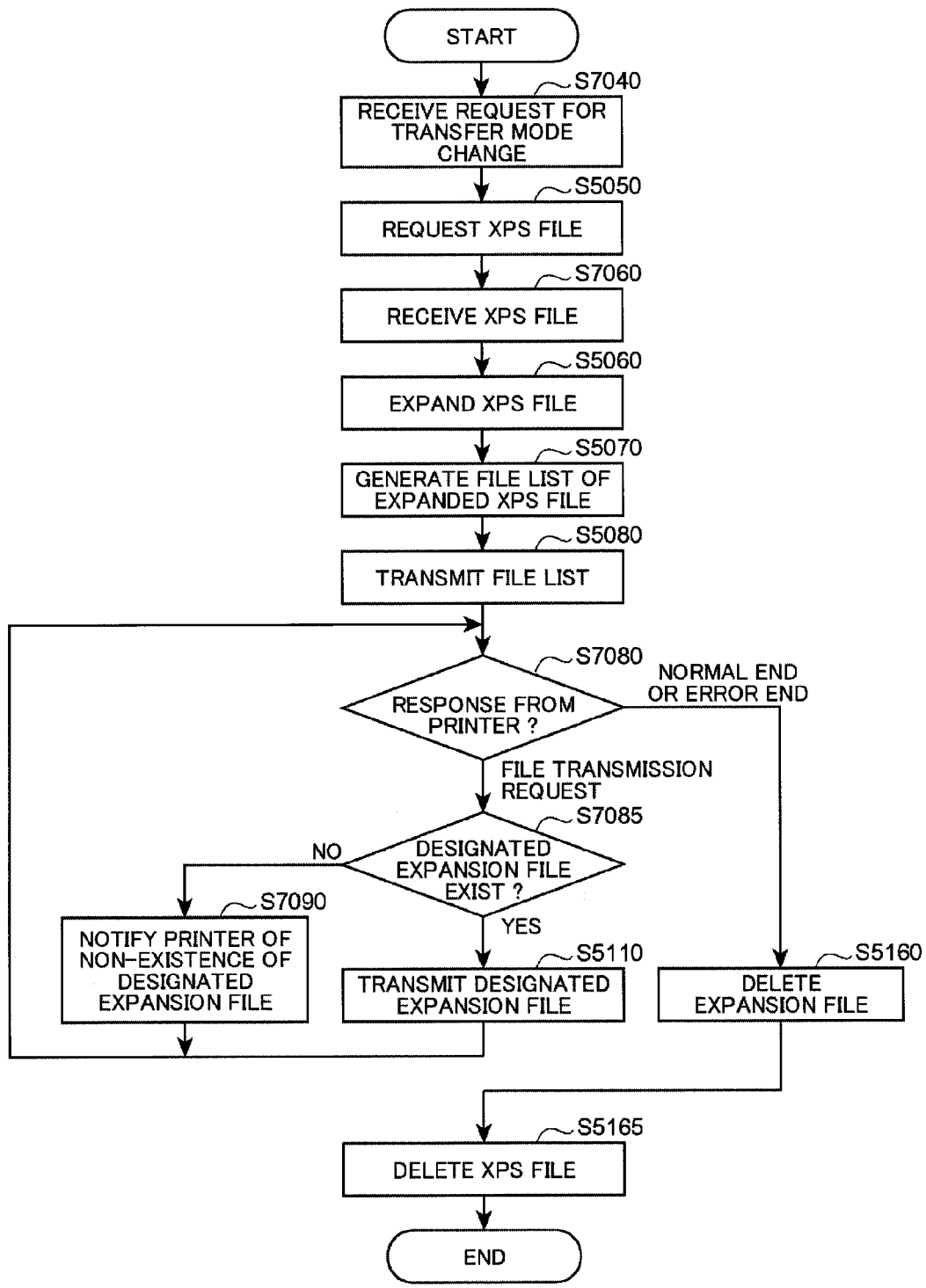
FIG. 14 is another flowchart illustrating an example operating procedure of an assist utility according to the second embodiment.

Referring to a flowchart of FIG. 14, a description is given of the example operating procedure by the assist utility 300.

When receiving the transfer mode change request in step S7040, the request receiving unit 310 requests with respect to the transfer mode change requesting unit 80 to transmit the XPS file (step S5050).

When the XPS file is received from the file transmission unit 95 of the printer 2000 (step S7060), the expansion data administration unit 340 provides an instruction with respect to the compressed data expansion unit 350 to expand the received XPS file. Upon receipt of the instruction, the compressed data expansion unit 350 expands the XPS file (step S5060).

The expansion data administration unit 340 provides an instruction with respect to the expansion data storage administration unit 330 to store the expansion file expanded by the compressed data expansion unit 350 in the storage medium (not shown). Upon receipt of the instruction, the expansion data storage administration unit 330 allows the expansion file to be stored in the storage medium (not shown).

When the expansion file is stored in the storage medium (not shown), the file list generation unit 320 generates a directory structure of the expansion file as the file list as illustrated in FIG. 4 (step S5070). When the file list generation unit 320 generates the file list, the expansion data administration unit 340 provides an instruction to the file transmission unit 360 to transmit the file list to the printer 2000. Upon receipt of the instruction, the file transmission unit 360 transmits the file list to the printer 2000 through the communication port of the port number 9100 (step S5080).

The assist utility 300 is on standby until a response from the printer 2000 is received (step S7080). Where the response from the printer 20 is the "normal end" or the "error end" (normal end or error end in step S7080), the request receiving unit 310 provides an instruction with respect to the expansion data administration unit 340 to delete the expansion file. Upon receipt of the instruction, the expansion data administration unit 340 allows the expansion file to be deleted (step S5160). Subsequently, the assist utility 300 allows the XPS file to be deleted (step S5165), and the flow ends.

Where the request for transmission of a designated expansion file is received by the request receiving unit 310 (file transmission request in step S7080), on the other hand, a file name of the designated expansion file is notified to the expansion data administration unit 340. Upon receipt of the designated expansion file name notice, the expansion data administration unit 340 confirms the presence or absence of the expansion file corresponding to the designated expansion file name, that is, confirming whether or not the expansion file corresponding to the designated expansion file name is stored in the storage medium (not shown) in step 57085. Where the expansion file corresponding to the designated expansion file name is stored in the storage medium (Yes in step S7085), the expansion data administration unit 340 provides an instruction to the file transmission unit 360 to transmit the expansion file to the printer 2000. Upon receipt of the instruction, the file transmission unit 360 transmits the designated expansion file (step S5110), and the flow returns to step S7080. Where the expansion file corresponding to the designated expansion file name is not stored in the storage medium (No in step S7085), the expansion data administration unit 340 notifies the printer 2000 of "non-existence of designated expansion file" (step S7090), and the flow returns to step S7080.

According to the second embodiment, the communication port of the port number 50000 is employed for communication from the printer 2000 to the host PC 2500 while the communication port of the port number 9100 is employed for communication from the host PC 2500 to the printer 2000. However, any port number may be employed as long as the port number is not reserved beforehand.

According to the second embodiment described above, the compressed PDL data are expanded on the side of the host PC 2500, and the printer 2000 can request the side of the host PC

2500 to provide the necessary file on a file basis (i.e., file by file) as needed. Therefore, the printer 2000 can reduce (if not prevent) the possibility of an insufficient memory even in a case of printing the compressed PDL data having a memory size which could not be received by the printer, or in a case of printing the compressed PDL data having a memory size exceeding the memory capacity of the printer as a result of the file expansion, so that the printing operation can be executed. According to the second embodiment, moreover, the application independent of the driver is employed, so that an advantage similar to the first embodiment can be obtained in a case where a driver not corresponding to the printer 2000 is installed in the host PC 2500.

According to the first and second embodiments, the printer is described as an example of the image forming apparatus. However, the present invention is not limited thereto, and may be applied to an apparatus capable of processing the PDL data. For example, the present invention may be applied to a multi-functional peripheral (MFP), a facsimile machine, and a copier.

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image forming apparatus receiving and processing data transmitted from an image processing apparatus, the image forming apparatus comprising:
    a receiving unit receiving first data based on printing information and second data different from the first data;
    a determination unit determining whether or not the first data received are processable;
    a requesting unit requesting the image processing apparatus to transmit processable second data serving as image information corresponding to the first data in a case where the determination unit determines that the first data are unprocessable; and
    an image forming unit forming an image based on the second data received.

2. The image forming apparatus according to claim 1, wherein the data are print data, and
    wherein the print data are compressed and have a directory structure inside thereof.

3. The image forming apparatus according to claim 1, wherein the first data are configuration information of the data.

4. The image forming apparatus according to claim 1, further comprising a data storage administration unit,
    wherein the determination unit compares a capacity of the data and a data storage capacity of the data storage administration unit to determine whether or not the data are storable in the data storage administration unit.

5. The image forming apparatus according to claim 1, wherein the requesting unit respectively acquires a plurality of files made of the second data.

6. An image forming apparatus receiving and processing data transmitted from an image processing apparatus, the image forming apparatus comprising:
    a receiving unit receiving first data based on printing information, second data different from the first data and third data corresponding to the second data;
    a determination unit determining whether or not the first data received are processable;
    a requesting unit requesting the image processing apparatus to transmit the third data and to change a transfer mode from a first transfer mode allowing the first data to be transferred as they are to a second transfer mode allowing the second data to be sequentially transferred in a case where the determination unit determines that the first data are unprocessable, the requesting unit further requesting the image processing apparatus to transmit the second data serving as image information corresponding to the first data based on the third data received upon receipt of the third data from the image processing apparatus; and
    an image forming unit forming an image based on the second data received.

7. The image forming apparatus according to claim 6, wherein the third data are a file list of a file administered inside the image processing apparatus.

8. The image forming apparatus according to claim 7, wherein the second requesting unit requests the image processing apparatus to acquire the file written in the file list using a file path of the file.

9. The image forming apparatus according to claim 7, wherein the second data are file data corresponding to a file path written in the file list.

10. An image forming system comprising:
    an image processing apparatus and an image forming apparatus,
    the image forming apparatus receiving and processing data transmitted from the image processing apparatus, the image forming apparatus including:
    a receiving unit receiving first data based on printing information and second data different from the first data;
    a determination unit determining whether or not the first data received are processable;
    a requesting unit requesting the image processing apparatus to transmit processable second data serving as image information corresponding to the first data in a case where the determination unit determines that the first data are unprocessable; and
    an image forming unit forming an image based on the second data received, and
    the image processing apparatus including:
    a control unit generating the first data based on a print execution instruction, the control unit generating the second data based on the request from the requesting unit of the image forming apparatus; and
    a transmission unit transmitting the first data and the second data.

11. The image forming system according to claim 10, wherein the first data are configuration information of the data.

12. The image forming system according to claim 10, wherein the image forming apparatus further includes a data storage administration unit, and
    wherein the determination unit compares a capacity of the data and a data storage capacity of the data storage administration unit to determine whether or not the data are storable in the data storage administration unit.

13. The image forming system according to claim 10, wherein the image processing apparatus further includes an expansion file storage administration unit storing a file subsequent to expansion, and
    wherein the first control unit performs an expansion process with respect to the data and allows the data to be stored in the expansion file storage administration unit.

14. The image forming system according to claim 10, wherein the image processing apparatus further includes a file administration unit administering a file subsequent to expansion, and wherein the file administration unit administers an access to the file subsequent to the expansion stored in the expansion file storage administration unit.

15. The image forming system according to claim 10, wherein the first control unit generates a file list of a file, subsequent to expansion, administered by the file administration unit and allows the transmission unit to transmit the file list with respect to the image forming apparatus.

16. The image forming system according to claim 10, wherein the second control unit allows the transmission unit to transmit a file corresponding to a file path requested by the image forming apparatus to the image forming apparatus.

17. An image forming system comprising:
an image processing apparatus and an image forming apparatus,
the image forming apparatus receiving and processing data transmitted from the image processing apparatus, the image forming apparatus including:
a receiving unit receiving first data based on printing information, second data different from the first data and third data corresponding to the second data;
a determination unit determining whether or not the first data received are processable;
a requesting unit requesting the image processing apparatus to transmit the third data and to change a transfer mode from a first transfer mode allowing the first data to be transferred as they are to a second transfer mode allowing the second data to be sequentially transferred in a case where the determination unit determines that the first data are unprocessable, the requesting unit further requesting to transmit the second data serving as image information corresponding to the first data based on the third data received upon receipt of the third data from the image processing apparatus;
an image forming unit forming an image based on the second data received, and
the image processing apparatus including:
a control unit generating the first data based on a print execution instruction, the control unit generating the third data and the second data based on the request from the requesting unit of the image forming apparatus; and
a transmission unit transmitting the first data, the third data and the second data.

18. The image forming system according to claim 17, wherein the third data are a file list of a file administered inside the image processing apparatus.

19. The image forming system according to claim 18, wherein the second requesting unit requests the image processing apparatus to acquire the file written in the file list using a file path of the file.

20. The image forming system according to claim 18, wherein the second data are file data corresponding to a file path written in the file list.

21. A method for processing data, comprising the steps of:
receiving first data based on printing information;
determining whether or not the first data received are processable;
requesting transmission of processable second data serving as image information corresponding to the first data in a case where the first data are determined to be unprocessable;
receiving the second data; and
forming an image based on the second data received.

22. A method for processing data, comprising the steps of:
receiving first data based on printing information;
judging whether or not the first data received are processable;
requesting to transmit third data and to change a transfer mode from a first transfer mode allowing the first data to be transferred as they are to a second transfer mode allowing second data to be sequentially transferred in a case where the first data are judged to be unprocessable;
receiving the third data;
requesting to transmit the second data serving as image information corresponding to the first data based on the third data received upon receipt of the third data;
receiving the second data; and
forming an image based on the second data received.

* * * * *